Feb. 8, 1955 J. F. HAYNES 2,701,512
ROTARY TILLER
Filed Sept. 21, 1950 2 Sheets-Sheet 2
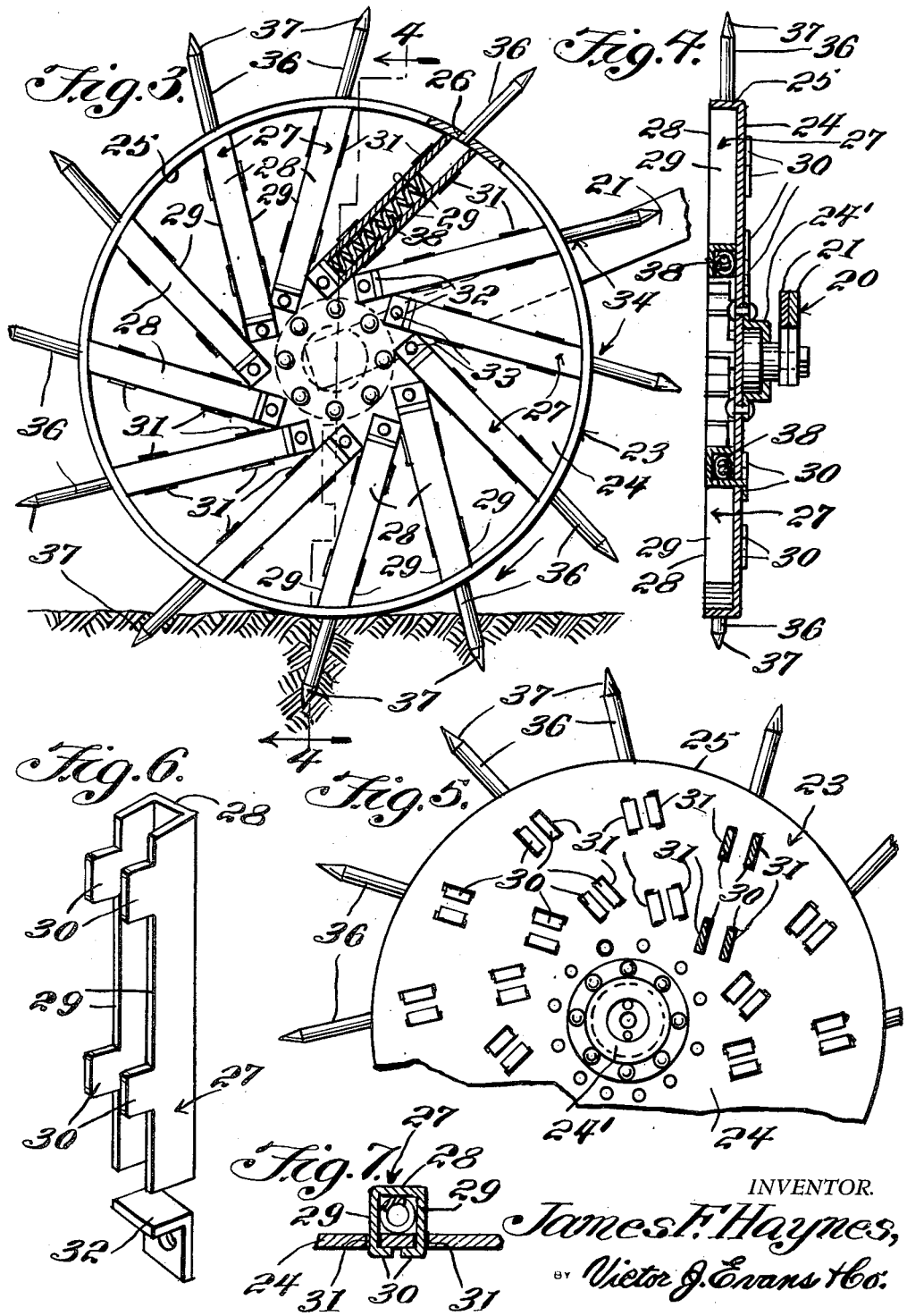
INVENTOR.
James F. Haynes,
BY Victor J. Evans & Co.
ATTORNEYS

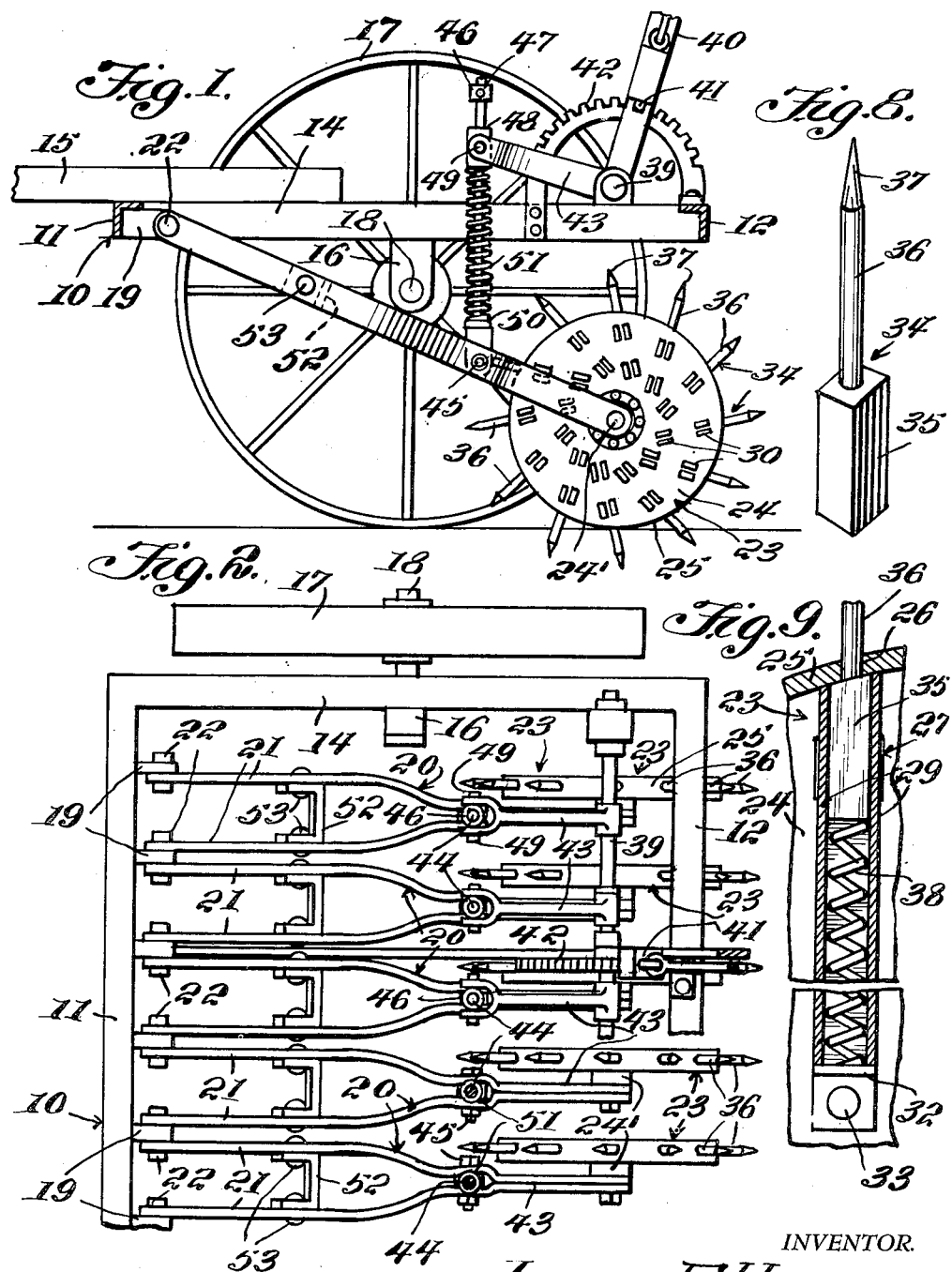

2,701,512
ROTARY TILLER

James F. Haynes, Murfreesboro, Tenn.

Application September 21, 1950, Serial No. 186,075

1 Claim. (Cl. 97—216)

This invention relates to agricultural equipment, and more particularly to a rotary tiller or cultivator.

The object of the invention is to provide a rotary tiller which can be readily attached to a suitable vehicle, such as a tractor, whereby movement of the vehicle causes the tiller to rotate and thereby break up or cultivate the ground.

Another object of the invention is to provide an adjustable rotary tiller that includes a plurality of spring-pressed teeth or prongs for engagement with and cultivation of the ground when the tiller is drawn along the ground, the tiller of the present invention being constructed so that uneven as well as even ground can be cultivated.

A further object of the invention is to provide a rotary tiller which is extremely simple and inexpensive to manufacture.

Other objects and advantages will be apparent during the course of the following description.

In the accompanying drawings forming a part of this application, in which like numerals are used to designate like parts throughout the same:

Figure 1 is a fragmentary side elevational view of the present invention, showing the rotary tiller attached to a vehicle hitch, with parts broken away and in section;

Figure 2 is a fragmentary top plan view of the rotary tiller of the present invention;

Figure 3 is an enlarged side elevational view, showing one of the rotary discs, and with parts broken away and in section;

Figure 4 is a sectional view taken on the line 4—4 of Figure 3;

Figure 5 is a fragmentary side elevational view, with parts broken away and in section, and looking in the opposite direction from Figure 3;

Figure 6 is a perspective view of one of the mounting housings;

Figure 7 is a transverse sectional view taken through one of the mounting housings;

Figure 8 is a perspective view of one of the prongs or teeth;

Figure 9 is a sectional view showing the construction of one of the housings connected to the disc.

Referring in detail to the drawings, the numeral 10 designates a rectangular shaped mounting frame, Figures 1 and 2, which may be made of any suitable material, such as angle iron. The frame 10 includes a front end piece 11 and a rear end piece 12, there being side pieces 14 extending between the end pieces and secured thereto. Extending forwardly from the front end piece 11 and secured thereto, as by welding, is a tongue or hitch 15, whereby the frame can readily be attached to a suitable vehicle, such as a tractor.

Extending from each of the side pieces 14 is a flange 16, and a pin or shaft 18 rotatably connects a large wheel 17 to each of the flanges 16, the wheels 17 serving to support the frame of the rotary tiller of the present invention. Extending rearwardly from the front end piece 11 is a plurality of spaced parallel ears 19, the ears 19 being secured to the end piece 11 in any suitable manner, as by welding. A plurality of brackets or frames 20 are pivotally connected to the ears 19. Each of the brackets 20 includes coacting arms 21, Figure 2, and the arms 21 have their front ends pivotally connected to the ears 19 by pins 22. A suitable bearing 24' rotatably connects the rear end of each of the brackets 20 to a rotary disc 23, the bearing 24' being conventional and being shown in Figure 4. Each of the discs 23 can thus move independently up and down, due to the pivotal connection 22, and each of the discs 23 includes a vertically disposed plate 24, and an annular flange or rim 25. The rim 25 is provided with a plurality of spaced openings 26, Figure 9, for a purpose to be later described.

Each of the discs 23 has connected thereto a plurality of mounting housings or casings 27, Figure 6. Each of the housings 27 includes a back wall 28 and side walls 29. Projecting from the side walls 29 is a plurality of spaced fingers 30. The fingers 30 are adapted to be projected through suitable slots 31 in the plate 24. Then, after the fingers 30 have been inserted through the slots 31, these fingers 30 can be bent over toward each other so as to permanently affix the housings 27 to the discs 23. Also, for each of the housings 27 an L-shaped bracket 32 is secured to the disc 23 by a suitable securing element, such as a bolt-and-nut assembly 33.

Slidably arranged in each of the housings 27 is a prong or tooth 34. Each of the prongs 34 includes a body portion 35, Figure 8, and projecting from the body portions 35 is a stem 36, the outer or free end of the stem 36 being tapered or pointed, as at 37. A coil spring 38 is arranged in each of the housings 27, one end of the coil spring 38 abutting the body portion 35 of the prong 34, while the other end of the coil spring 38 abuts the bracket 32. The coil springs 38 serve to normally urge the prongs 34 outwardly of the discs 23, but the coil springs 38 permit the prongs 34 to move back into the housings 27 in the event the prongs strike or contact a rock or other hard object, so that damage to these parts will be prevented.

Extending between the side pieces 14 and rotatably supported thereby is a horizontally disposed shaft 39, Figure 2. A lever 40 has its lower end secured to the shaft 39, and the lever 40 carries a spring-pressed pawl 41, the pawl 41 being mounted for movement into and out of engagement with the teeth of a sector plate 42, Figure 1. The sector plate 42 coacts with the lever and prongs so as to enable the user to lock the lever in its various adjusted positions.

Extending from the shaft 39 is a plurality of spaced bars 43, Figure 2. The bars 43 each have one end secured to the shaft 39, while the other end of each of the bars 43 is bifurcated.

Extending upwardly from each of the brackets 20 is a movable rod 44. Each of the rods 44 has its lower end pivotally connected between the arms 21 of the brackets 20 by a suitable bolt-and-nut assembly 45, Figure 1. A bushing 46 is secured to the upper end of each of the rods 44 by a set screw 47, and a sleeve 48 is slidably arranged on each of the rods 44. The bifurcated end of each of the bars 43 straddles the complemental sleeve 48, and a pin 49 pivotally connects the bifurcated end of the bar 43 to the sleeve 48. By means of this construction, the discs 23 are all urged downwardly into engagement with the ground, but in the event that the discs contact rough ground or rocks, the springs 51 which are circumposed on each of the rods 44 will enable the brackets 20 and discs 23 to move upwardly to prevent damage to the parts. The lower end of the spring 51 contacts a suitable collar 50 which is mounted on the rod 44 adjacent the lower end thereof. The bolt-and-nut assemblies 45 pivotally connect the rods 44 to the brackets 20.

From the foregoing, it is apparent that a rotary tiller has been provided which is especially suitable for cultivating or breaking up the ground. A tiller of the present invention can be readily attached to a tractor or other vehicle by means of the tongue 15, and when the vehicle moves, the plurality of discs 23 will be caused to rotate. The discs 23 each carry a plurality of spring-pressed prongs 34, and the pointed ends 37 of the prongs 34 strike or engage the ground at such an angle, Figure 3, that the dirt or earth is caused to be sufficiently cultivated. The coil springs 38 normally urge the prongs or teeth 34 outwardly, but in the event that the teeth contact or engage rocks or other hard surfaces, there will be no damage to the parts, since the prongs can be biased or urged inwardly against the pressure of the coil springs 38. Also, the coil springs 41 enable the brackets 20 to pivot about the pins 22 in the event that uneven ground is encountered, so that the tiller of the present invention can be used for cultivating even as well as uneven ground. Braces 52 extend between the arms 21 of the brackets 20, and the braces 52 are secured to the arms in any suitable manner, as by rivets or bolt-and-nut assemblies 53. The braces 52 serve to maintain the arms in their proper spaced relation. Since each tooth or prong 34 is a separate tool, these parts can be readily removed or replaced as desired. Also, broken discs can be readily disassembled and replaced if necessary.

I claim:

In a rotary tiller disc, a vertically disposed circular plate having an integral annular rim, said plate being provided with a plurality of spaced slots, said slots extending at substantially 45 degree angles with relation to given radii of said disc, said rim being continuous and having a plurality of spaced openings therein arranged in alignment with the slots in said plate, a plurality of U-shaped housings connected to said disc, each of said housings including a back wall and a pair of spaced parallel side walls, the outer surface of the back wall of said housing lying in the same plane as the free edge of said rim, a plurality of integral spaced fingers projecting from the free edges of said side walls and extending through the slots in said plates, said fingers being arranged in alignment with respect to each other, portions of said fingers being bent transversely to maintain the housings connected to said plate, an L-shaped bracket secured to said plate at the inner end of each housing, said housings having their outer ends bevelled for snugly engaging the inner curved surface of said rim, the inner ends of said back and side walls being flat and lying in the same plane, said bracket including a first leg abutting said plate and a second leg abutting the flat inner end of the housing, a prong slidably mounted in each housing and including a rectangular shaped body portion arranged in each of said housings, a cylindrical stem extending outwardly from said body portion and projecting through the openings in said rim, the outer ends of said prongs being pointed, the pointed end of said prongs and said body portions having their longitudinal axes coinciding, said body portion being of greater size than said stem, a coil spring positioned in each of said housings and having one end engaging the inner end of said body portion and its other end abutting the second leg of said bracket for urging said prongs outwardly of said disc, and a hub secured to the center of said plate.

References Cited in the file of this patent

UNITED STATES PATENTS

| | | |
|---|---|---|
| 586,107 | Packham | July 13, 1897 |
| 1,087,389 | McLeod | Feb. 17, 1914 |
| 1,157,670 | Boswell | Oct. 26, 1915 |
| 1,249,008 | Bonds | Dec. 4, 1917 |
| 1,531,064 | Bennett | Mar. 24, 1925 |
| 2,243,241 | Burns | May 27, 1941 |
| 2,593,065 | Simon | Apr. 15, 1952 |